Dec. 7, 1965   C. G. L. BORGSTRÖM ETAL   3,222,010
SPINNING REELS
Filed April 4, 1962   2 Sheets-Sheet 1
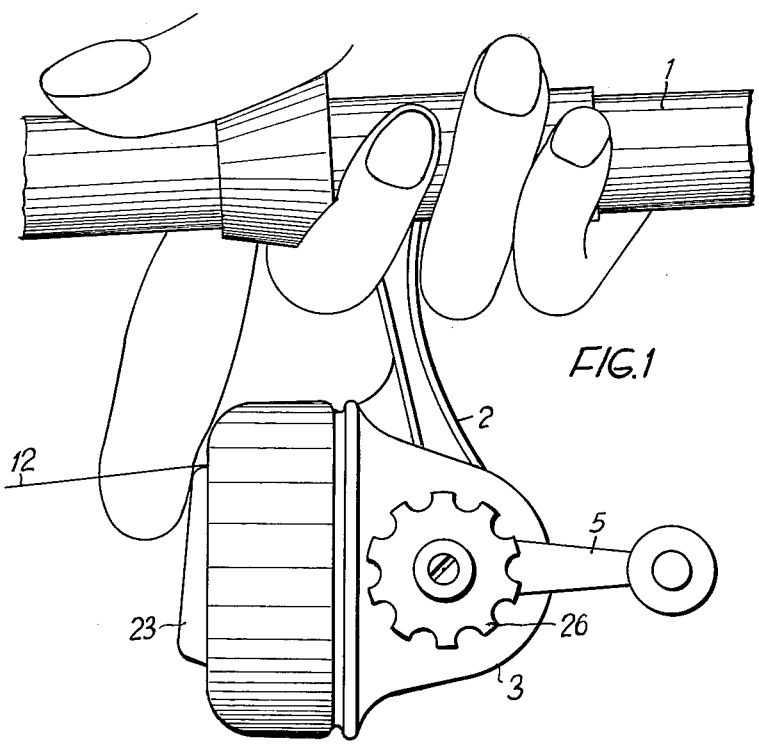
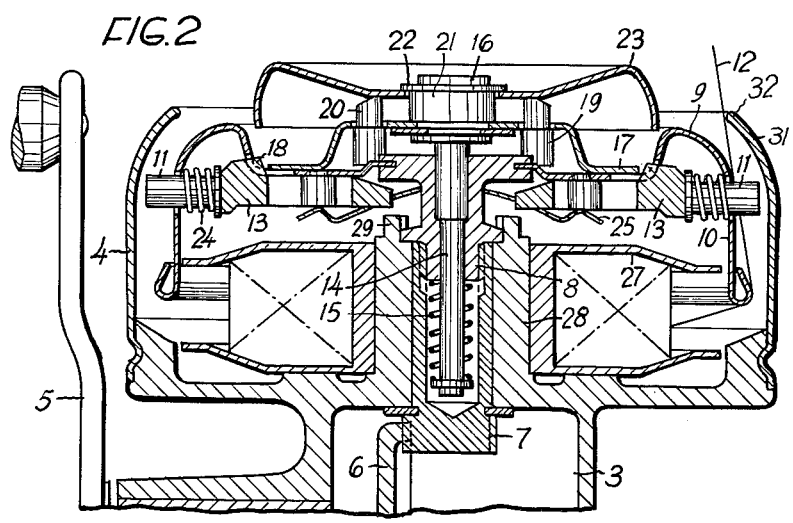

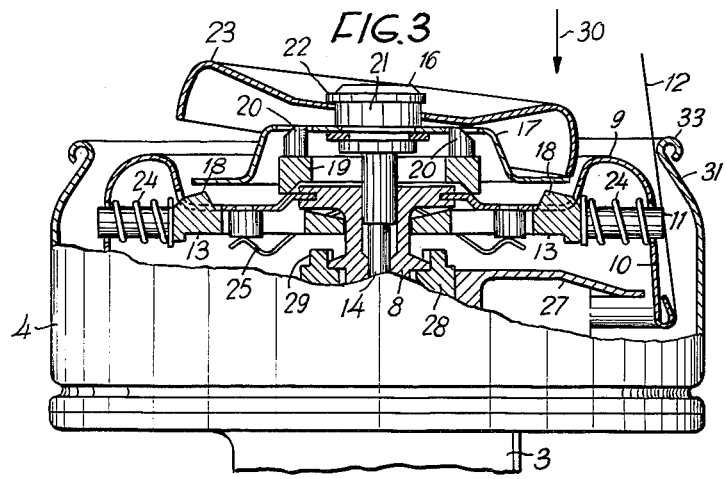
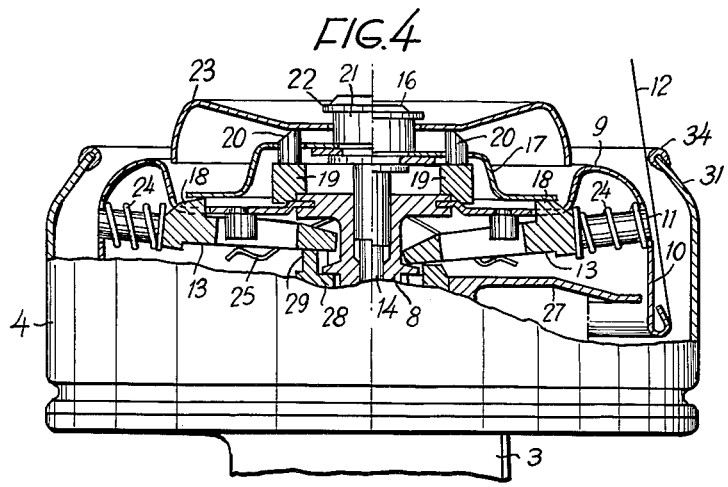

3,222,010
SPINNING REELS
Carl Göte Lennart Borgström and Per Enar Lennart Frode, both of Svängsta, Sweden, assignors to Ab Urfabriken, Svängsta, Sweden, a corporation of Sweden
Filed Apr. 4, 1962, Ser. No. 184,987
Claims priority, application Sweden, Feb. 9, 1960, 1,299/60
3 Claims. (Cl. 242—84.2)

This application is a continuation-in-part of our copending application for Spinning Reel, Serial No. 87,797, filed February 8, 1961, and now abandoned.

This invention relates to spinning reels of the spinning type comprising a stationary line spool, a line guide cap extending over the front face and down over the front part of the spool and mounted for rotation by driving means such as a crank, a line guide pin mounted in said line guide for radial displacement between from outer position, in which the pin extends through the path of motion of the line outside the line guide cap, to an inner position in which the pin is retracted within the outer periphery of the line guide, a spring actioning the line guide pin towards its inner position and a cam for the automatic outwards displacement of the line guide pin upon rotation of the line guide cap.

Though the spool is mentioned above as stationary, this quality only refers to the functions proper of the device herein concerned, which thus also can be applied to spinning reels in which the spool is rotatable against a braking resistance and/or axially reciprocable during winding for even repartition of the line.

Different embodiments of spinning reels of this type have been designed, in which the release of the line by release of the line guide pin for retraction under the action of its spring is obtained by axial displacement either of the line guide cap, in which the line guide pin is guided, or of a retaining member for the line guide pin.

The number of line guide pins in the line guide cap is of no concern in this connection. Though the embodiment hereinafter described and illustrated in the drawings comprises two line guide pins it is understood, that even one, three or more such pins can be disposed in essentially symmetrical arrangement around the line guide cap.

Further also different embodiments of spinning reels of the type known as open reels have been designed, in which the front face of the spool facing in the direction in which the line is paid off is uncovered and in which the line guide consists of a stirrup which can be turned from a release position, in which the line can be drawn off the stationary spool, to a winding position in which the stirrup, when rotated, leads the line around the spool for winding, or vice versa. In spinning reels of the latter type the line must be held with a crooked finger (preferably the forefinger of the hand holding the rod) and the stirrup must be turned to the release position before the throwing out of the bait. At an appropriate point of the throwing motion of the rod the line must then be released by the finger by straightening it out and moving it away. The line guide stirrup is generally arranged for being automatically turned to the winding position upon its rotation by means of the driving crank.

The purpose of the present invention is to provide a spinning reel, in which the line during the throwing motion is prevented from running off the spool by a finger, but in which the necessity of placing the line by means of the crank into a determined position relative to the finger, of leading the line inside the finger and thereafter to turn the stirrup into the release position is avoided, the line being automatically released, brought into contact with the finger and stopped by it when it is placed in the desired position.

In spinning reels having an outer cover, for example of the type described in the U.S. patent application Ser. No. 64,801, filed October 25, 1960, and now Patent No. 3,108,761, in which a retaining member for the line guide pin is displaced axially by a special operating member, and in which the line guide pin is first retracted and the line is released before the line is squeezed against the inside of the cover by a brake pad mounted on the retaining member, there is a space of time during which the line is released by the line guide pin and not yet clamped between the inside of the cover and the brake pad. The line is thus free for unwinding during this space of time and can also be released during the throwing motion if the operating member is released too early. In both cases the throw is a failure. The brake pad can also be unevenly worn. If the line cooperates with a worn place of the brake pad forming a recess therein, the braking effect is insufficient and even in this case the line can run out too early during the throwing motion. These drawbacks are not very important in practice if the reel is cleverly handled and carefully attended to, but they have induced many fishermen to prefer the older type of open spinning reels with a line guide stirrup.

By the invention the above mentioned drawbacks of both types of spinning reels are avoided thereby, that an operating member for the retaining member is disposed centrally at the outside of the line guide cap, i.e. the side of the reel on which the line runs out along the rod, in such manner that a finger used for operation of the operating member lies automatically in the path of motion of the line during its wandering round the line guide cap when the line is drawn off the spool and thereby automatically prevents the line from being unwound.

The spinning reel according to the invention shows a simple construction and has further the advantage, that by the direct guiding of the line with a finger during the throwing motion a better control of the line by the feeling sense in the finger is obtained, and further that the necessity of guiding the line by hand to the right position relative to the finger, before throwing and of reversing the stirrup to the release position is avoided. In relation to spinning reels with an outer cover and a brake pad for braking the line against the inside of the cover, any insecurity due to the momentary release of the line between the retraction of the line guide pins and the braking of the line upon the displacement of the retaining member, and the lack of direct feeling contact with the line very noticeable for experienced fishermen, is eliminated by the invention.

A secondary purpose of the present invention is to provide for a guiding for the line in said annular channel about said cap so as to obtain a minimum of friction between the line and the adjacent parts and simultaneously to prevent the line from being bent outwards over the end of the line guide pin or against other parts of the rod or the hand holding the same under the action of centrifugal force produced by the rotation of the line around the cap.

An embodiment of the invention is shown in the accompanying drawings, in which:

FIG. 1 is a side view of a spinning reel according to the invention with a portion of the rod handle on which it is mounted, and the hand operating the reel.

FIG. 2 is a side view of the reel, sectioned in part, showing the members in the winding position and a border portion of the spool housing according to one embodiment of the invention.

FIG. 3 is a sectioned side view similar to that of FIG. 2 with the parts of the reel in the position occupied during the throwing motion and a border portion of the spool housing according to a second embodiment of the invention.

FIG. 4 is a sectioned side view similar to that of FIG. 2 with the parts of the reel in one of two possible release positions in each half of the figure and a border portion of the spool housing according to a third embodiment of the invention.

Referring to FIG. 1 the reel is mounted on a rod 1 in conventional manner by means of a foot 2 and comprises a gear casing 3 and a spool casing 4. On the outside of the gear casing, FIG. 1 shows a crank 5 and an adjusting knob 26 for the adjustment of a friction brake coupled in known manner between the crank 5 and the line guide cap. On the shaft of the crank is mounted a driving gear 6, shown in FIG. 2 meshing with a gear 7 formed or fixedly mounted on the inner end i.e. the lower end in FIGS. 2 to 4 of a winding shaft 8 mounted for rotation in a hub 28 in the spool casing. The outer (upper) end of the winding shaft 8 is rigidly connected with a line guide cap 9, the border portion 10 of which extends downwards over a portion of a line spool 27 mounted in the spool casing. On the outer periphery of the border portion 10 of the line guide cap 9 there are holes, in the case illustrated two of them, though their number might be less or larger, said number being of no essential importance in connection with the invention. Through these holes a line guide pin 11 projects outside the line guide cap 9 into the path of motion of the line 12. Said pins can be retracted within the line guide cap 9 out of said path of motion of the line 12 when pulled off, during which it wanders around the cap 9. The line guide pins 11 are formed on the radial outer end pin slides 13, the construction and function of which is described in the Patent No. 3,108,761. The slide 13 is radially displaceably guided by the line guide pin 11 in the border portion 10 of the line guide cap 9 and by a guide pin projecting inside the line guide cap from its plane central portion and engaging a slot in the slide. The pin slide 13 is in the just mentioned application even stated to be able of rocking motion in a radial plane around the passage or the pin 11 in the edge portion 10 of the cap 9.

In a bore in the spool shaft 8 is axially guided a rod 14, urged by a spring 15 towards the inner (lower) end of the shaft. The outer (upper) end of the rod 14 extends outside the shaft and forms a head 16, which is rigidly connected with a retaining member 17 in the shape of a plate maintained by the spring 15 in contact with the upper face of the central portion of the line guide cap 9. The edge of the retaining member 17 cooperates with abutments 18 on each of the pin slides 13 and maintains these in their radially outwards projecting positions (FIG. 2) in which the line guide pin 11 extends into the path of motion of the line 12. Resting upon the outside of the central portion of the line guide cap 9 there is a ring 19 having a number of pins 20 extending in axial direction through corresponding holes in the retaining plate 17. The head 16 on the rod 14 has a cylindrical surface 21 limited upwards by a radial flange 22. The cylindrical surface serves as a guiding surface for a central hole in an operating member 23 in the form of an upside down turned cup or a disc, there being sufficient play between the cylindrical surface of the head and the hole in the operating member to allow the tilting of the operating member into an inclined position relative to the reel shaft. In the position shown in FIG. 2, which is the winding position, i.e. the position in which the line guide pins are projecting outside the line guide cap 9 for winding the line on the spool by turning the line guide cap 9 by means of the driving crank 5, the flange 22 of the head 16 urged downwards by spring 15 cooperates with the edge of the hole in the operating member 23 and maintains the latter in contact with the upper ends of the pins 20 on the ring 19, the retaining member 17 being simultaneously maintained by the same spring 15 in the position, in which the pin slides are prevented from inwards displacement under the action of their retracting springs 24. An annular leaf spring 25 maintains simultaneously the slides 13 in their upper positions in abutment against the inside of the plane central position of the line guide cap.

For the throwing of the bait the rod is gripped as shown in FIG. 1. The border portion of the operating member 23 is depressed with the forefinger, whereby said operating member is tilted around the supporting pin situated nearest to the depressed part of the border at 30 (FIG. 3), the inclined position of the operating member being shown in FIGS. 1 and 3. By this tilting movement of the operating member 23 around the top of one or two of the pins 20 the rod 14 is lifted by means of the flange 22 on the head while the spring 15 is compressed. Together with the head 16 the retaining member 17 is also lifted, whereby its edge is lifted out of the path of motion of the abutments 18 on the pin slides 13, which then are free to be moved inwards under the action of the retracting springs 24. Thereby the line guide pins 11 are retracted out of the path of motion of the line which is drawn off the spool a portion of its path around the line guide cap sufficient to come to rest against the finger, as shown in FIG. 1, the finger preventing a further pulling off of the line while the rod is swung for the throwing of the bait. At the end of this swinging motion the finger is withdrawn from the path of the line and the bait flies out.

When the pressure on the operating member 23 is released, generally due to the withdrawal of the finger from the path of the line, or immediately after the depression and before the finger releases the line, the spring 15 draws the rod 14 with the head 16 and the retaining member 17 downwards from the position shown in FIG. 3 to any of the positions shown in each half of FIG. 4 in which the retaining member 17 presses the abutments 18 on the slides downwards and thereby moves the slides around the passages of the pins 11 in the border portion 10 of the line guide cap. On the hub 28 of the spool casing, in which hub the shaft 8 is journalled, there are two upwards extending projections 29 serving as cam means for the displacement of the pin slides 13 and the line guide pins 11 back to the outer projecting position. Dependent on the position of the line guide cap 9 relative to the projections 29 at the releasing of the operating member 23, the pin slides 13 are stopped with their inner ends either on the end faces of the projections as shown in the left half of FIG. 4, or between the projections 29 on the end face of the hub, as shown in the right half of FIG. 4. The parts remain in this position until the line has run out. As soon as the crank is turned for the winding in of the line, whereby the shaft 8 with the line guide cap 9, 10 is rotated, the inner ends of the slides 13 are pushed outwards by the projections 29, whereby the slides 13 with the line guide pins 11, the retaining member 17 and the operating member 23 are returned to their initial positions shown in FIG. 2 under the action of the springs 15 and 25. When the slides 13 at the beginning of the winding are in the position shown in the left half of FIG. 4 their inner ends fall first down between the projections 29 under the action of the spring 15 transmitted by the rod 14, the head 16, the retaining member 17 and the abutments 18 before they are pushed outwards.

In the FIGS. 2 to 4, the line 12 is shown in the position occupied when the line is stretched straight between the lower border of line guide cap 9 and the nearest stationary guide eye on the rod.

According to the invention the upper border portion 31 of the spool housing 4 is bent inwards, so that the border proper 32 of said housing 4 is situated essentially at the level or slightly above the level of the upper face of the line guide cap 9. The radial distance of said border 32 from the common axis of the line guide cap 9 and the spool housing 4 is equal to or slightly greater than the radial distance between said axis and the outside of the line, when this is stretched in the position illustrated. By this positioning of the border 32 of the spool housing 4 the following advantages are obtained: Unnecessary friction between the line and said border during the winding in or the throwing out of the line is avoided. The line is guided by the border of the spool housing near the pick-up pin 11 and at a sure radial distance from the outmost end of the projecting pick-up pin. The moving parts of the reel are well protected within the spool casing 4, the operating member 23 remaining still easily accessible for operation with the line controlling finger.

Because of the centrifugal force, the line will of course always be pressed outwards to a certain extent against the border 32 of the spool housing 4, but the friction between this border 32 and the line is diminished by the rounded shape and the surface finish of said border. This purpose can be attained in a still higher degree by forming the border into a rolled up torus-shaped portion 33 as shown in FIG. 3 or by providing the border 32 with a ring 34 of U-shaped cross section bent and pressed around said border and having a smooth and hard outer surface, as shown in FIG. 4.

The invention is not limited to the embodiments above described. This concerns especially the arrangement and operation of the line guide pin slides. Examples of such different embodiments are described in the U.S. Patent application Ser. No. 64,801 and do not concern the present invention, which relates to the means for operating the line guide pins.

Within the scope of the present application the shaping and arrangement of the operating member can be varied provided this is disposed centrally at the forward end of the reel in such manner, that the finger used for actuating the operating member automatically forms a stop for the free pulling off of the line.

What is claimed is:

1. A fishing reel of the spinning type comprising in combination, a line guide cap rotatably mounted for winding line on a spool, an open front annular casing about said line guide cap to provide the sole confining means about said cap to define an annular channel circumferential of said cap for passage of line, at least one line guide pin slidably mounted in the cap for projection to a position radially outside said cap and retraction to a position within said cap, means yieldably biasing said line guide pin toward one of said positioning other means operable to displace said line guide pin to the other of said positions, a retaining member mounted for rotation coaxial said cap for rotation therewith, said cap and said member being substantially axially adjacent each other and at least one of said cap and said member being axially displaceable with respect to the other to relatively displace said member from a retaining position for retaining said pin in said cap in said other position, a first instrumentality secured to said retaining member, a second instrumentality secured to said cap, said first and second instrumentalities being axially displaced from each other, and an operating member rockably connected to one of said instrumentalities and engageable with the other of said instrumentalities to selectively rock to axially displace said instrumentalities to selectively position said retaining member in a non-retaining position with respect to said cap and said pin.

2. A fishing reel of the spinning type having a line guide cap rotatably mounted for winding line on a spool, an open front annular casing defining an annular channel for passage of line about said cap, said casing having formed therein a frontal opening coaxial to said cap and of diameter substantially equal to said cap, at least one line guide pin slidably mounted in said cap for projection to a position radially outside said cap and retraction to a position within said cap, means yieldably biasing said pin toward said retracted position, a retaining member mounted for rotation about the axis of said cap and engageable with said pin when near said cap to retain said pin in said position of projection, at least one of said cap and said member being axially displaceable from the other, a first instrumentality secured to said retaining member, a second instrumentality secured to said cap, said first and second instrumentalities being axially displaceable from each other, and an operating member rockably connected to one of said instrumentalities and engageable with the other of said instrumentalities to selectively rock to axially displace said instrumentalities to selectably position said retaining member in a non-retaining position with respect to said cap and said pin.

3. A fishing reel of the spinning type having a line guide cap rotatably mounted for winding line on a spool, an open front annular casing defining an annular channel for passage of line about said cap, said casing having formed therein a frontal opening coaxial to said cap and of diameter substantially equal to said cap, at least two line guide pins slidably mounted in said cap for projection to a position radially outside said cap and retraction to a position within said cap, said pins being circumferentially spaced from each other about said cap, said pins having means yieldably biasing them toward said retracted position, a retaining member mounted for rotation about the axis of said cap and engageable with said pins when near said cap to retain said pins in said position of projection, at least one of said cap and said member being axially displaceable from the other, a first instrumentality secured to said retaining member, a second instrumentality secured to said cap, said first and second instrumentalities being axially displaceable from each other, and an operating member rockably connected to one of said instrumentalities and engageable with the other of said instrumentalities to selectively rock to axially displace said instrumentalities to selectively position said retaining member in a non-retaining position with respect to said cap and said pins.

References Cited by the Examiner
UNITED STATES PATENTS

| | | | |
|---|---|---|---|
| 2,630,979 | 3/1953 | Uerling | 242—84.2 |
| 2,667,312 | 1/1954 | Denison et al. | 242—84.2 |
| 2,711,292 | 6/1955 | Taggart et al. | 242—84.21 |
| 2,745,607 | 5/1956 | Taggart et al. | 242—84.21 |
| 2,828,927 | 4/1958 | Yeada | 242—84.2 |
| 2,929,579 | 3/1960 | Hull | 242—84.2 |
| 2,931,592 | 4/1960 | Sloan | 242—84.21 |
| 3,105,650 | 10/1963 | Kuether | 242—84.2 |

FOREIGN PATENTS 599,750   6/1960   Canada.

OTHER REFERENCES

Thoner: German application Ser. No. T 11,406, printed Aug. 9, 1956 (Kl 45 h 31).

MERVIN STEIN, *Primary Examiner.*
JOSEPH P. STRIZAK, *Examiner.*